(12) United States Patent
Sawhill et al.

(10) Patent No.: US 7,094,141 B2
(45) Date of Patent: Aug. 22, 2006

(54) METHOD AND APPARATUS FOR LOADING CASINGS ONTO THE STUFFING TUBE OF A SAUSAGE MAKING MACHINE

(75) Inventors: Matthew P Sawhill, Des Moines, IA (US); Kenneth L Lebsack, Ankeny, IA (US)

(73) Assignee: Stork Townsend Inc., Des Moines, IA (US)

( * ) Notice: Subject to any disclaimer, the term of this patent is extended or adjusted under 35 U.S.C. 154(b) by 336 days.

(21) Appl. No.: 10/225,389

(22) Filed: Aug. 21, 2002

(65) Prior Publication Data

US 2004/0038635 A1  Feb. 26, 2004

(51) Int. Cl.
*A22C 11/02* (2006.01)
(52) U.S. Cl. .......................................... 452/34; 452/32
(58) Field of Classification Search .................. 452/30, 452/31, 32, 33, 34, 39, 40
See application file for complete search history.

(56) References Cited

U.S. PATENT DOCUMENTS

| | | | | |
|---|---|---|---|---|
| 3,672,001 A | * | 6/1972 | Greider | 452/31 |
| 4,434,527 A | * | 3/1984 | Staudenrausch et al. | 452/34 |
| 4,569,101 A | * | 2/1986 | Tribbett | 425/133.1 |
| 5,092,813 A | * | 3/1992 | Kasai et al. | 452/46 |
| 5,092,814 A | * | 3/1992 | Kasai et al. | 452/47 |
| 5,297,983 A | * | 3/1994 | Mueller et al. | 452/33 |
| 6,066,035 A | * | 5/2000 | Hergott et al. | 452/31 |

FOREIGN PATENT DOCUMENTS

| | | | |
|---|---|---|---|
| EP | 0399582 | * | 11/1990 |
| ES | 2140286 | * | 10/2000 |

* cited by examiner

*Primary Examiner*—Peter M. Poon
*Assistant Examiner*—David J. Parsley

(57) ABSTRACT

A casing hopper for sausage encasing machines includes a hopper having a downwardly sloping bottom terminating in a downwardly extending fence wall. A chute wall is substantially vertically disposed in parallel spaced condition to the fence wall to form a substantially vertical casing passageway with respect to the fence wall. The chute wall terminates in an inclined flange that extends upwardly and inwardly below the passageway to form a cradle portion to receive a single hollow casing from the passageway. The passageway is of sufficient width to receive a plurality of longitudinally vertically stacked elongated hollow casings.

6 Claims, 6 Drawing Sheets

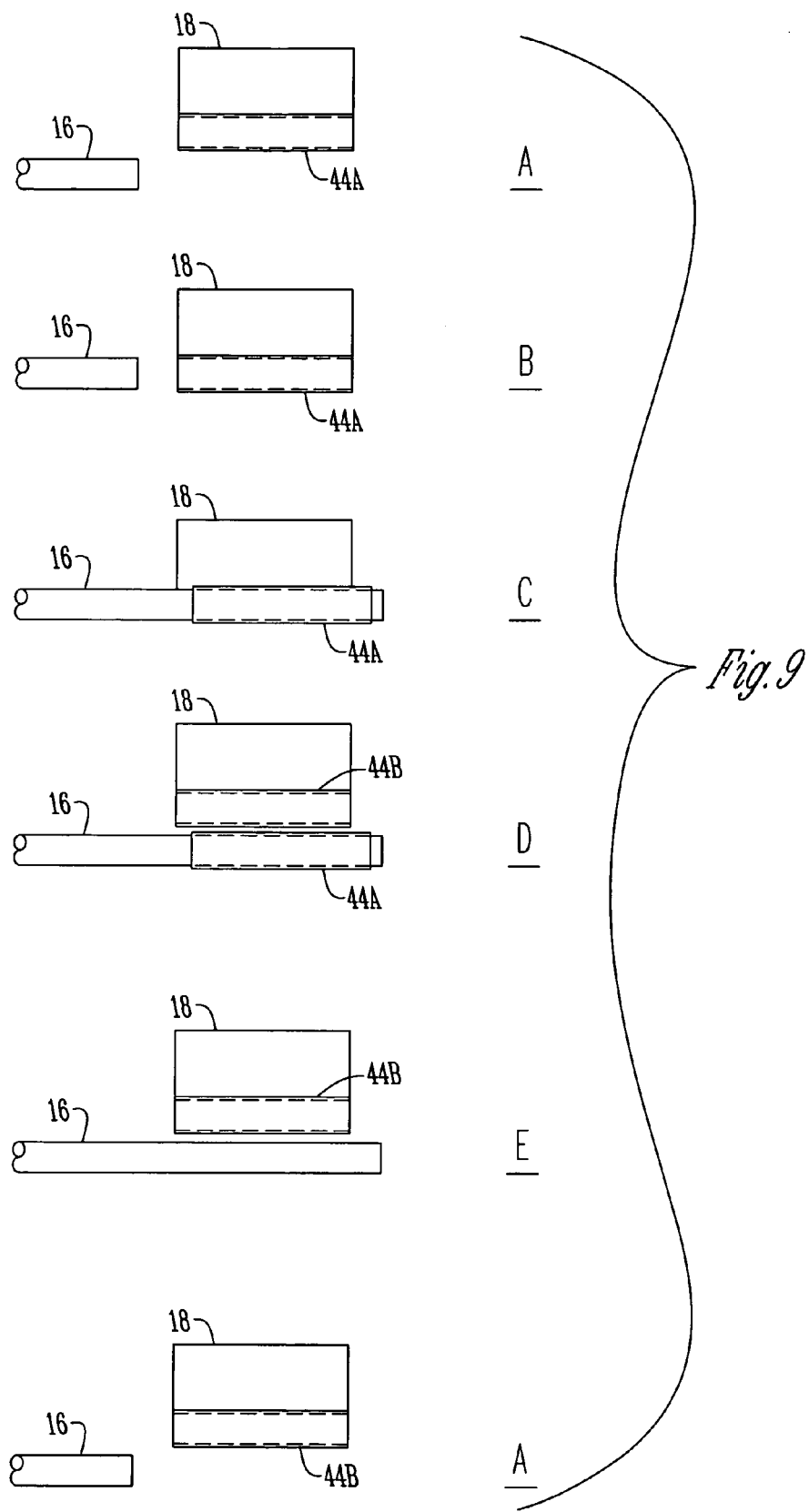

METHOD AND APPARATUS FOR LOADING CASINGS ONTO THE STUFFING TUBE OF A SAUSAGE MAKING MACHINE

BACKGROUND OF THE INVENTION

Sausage linking machines form long strands of sausage links. The links are created by stuffing a cylindrical thin wall-casing with meat emulsion, and then portioning the filled casing to create the individual links. The casing material comes in the form of cylindrical sticks (called casings) that must be loaded into the sausage machines. When one casing is consumed, another must be loaded in its place. The casings are thirty feet or more in length but are compressed to a shirred telescopic condition so as to form a shirred casing of ten or twelve inches in length. When placed on a meat stuffing tube of the machine, the meat emulsion is extruded through a discharge end of the tube into the casing which is progressively slidably removed from the outer surface of the tube as it is progressively being penetrated by the stuffing tube and then sequentially filled with meat emulsion.

A clamping mechanism is typically used to release the shirred casings from the hopper into a position where they can be filled sequentially with meat emulsion.

A principal object of this invention is to provide an improved method and apparatus for loading casings onto the stuffing tube of a sausage making machine.

A further object of this invention is to provide a method and apparatus for loading the casings onto a stuffing tube of a sausage making machine without the use of clamps or the like.

A still further object of this invention is to provide a method and apparatus for loading casings onto the stuffing tube of a sausage making machine to avoid any bridging of the casings in the hopper before they are in a position for being filled with meat emulsion.

A still further object of this invention is to provide a method and apparatus for loading casings onto the stuffing tube of a sausage making machine which is efficient and which is relatively free from maintenance.

These and other objects will be apparent to those skilled in the art.

SUMMARY OF THE INVENTION

A casing hopper moves so that the lowest casing in the hopper is aligned with the stuffing tube of a sausage encasing machine. The stuffing tube penetrates the casing and the casing hopper moves back to its first position leaving the casing on the stuffing tube to be conventionally filled with meat emulsion from the discharge end of the stuffing tube whereupon the casing is sequentially and progressively removed from the stuffing tube. The stuffing tube then is longitudinally withdrawn back to its starting position whereupon the hopper is again realigned with the stuffing tube so as to permit the stuffing tube to penetrate the next casing in the cradle.

This casing hopper has a downwardly sloping bottom terminating in a downwardly extending fence wall. A chute wall is substantially vertically disposed in parallel spaced condition to the fence wall to form a substantially vertical casing passageway with respect to the fence wall. The chute wall terminates in an inclined flange that extends upwardly and inwardly below the passageway to form a cradle portion to receive a single hollow casing from the passageway. The passageway is of sufficient width to receive a plurality of vertically stacked elongated hollow casings.

When a casing is aligned with the stuffing tube, the stuffing tube is moved longitudinally to penetrate the casing in the cradle so as to mount the casing on the outer surface of the stuffing tube. The cradle is moved out of alignment with the stuffing tube whereupon a second casing drops into the cradle.

The flange on the chute wall terminates in an elongated inward edge spaced from a lower end of the fence wall to permit only the single casing in the cradle to be moved laterally outwardly relative to the hopper from the flange beneath the fence when it is on the stuffing tube and the hopper moves away from the stuffing tube position.

BRIEF DESCRIPTION OF THE DRAWINGS

FIG. 9 is a schematic view showing the progressive steps of using the device of the invention.

DESCRIPTION OF THE PREFERRED EMBODIMENT

Figure 1:
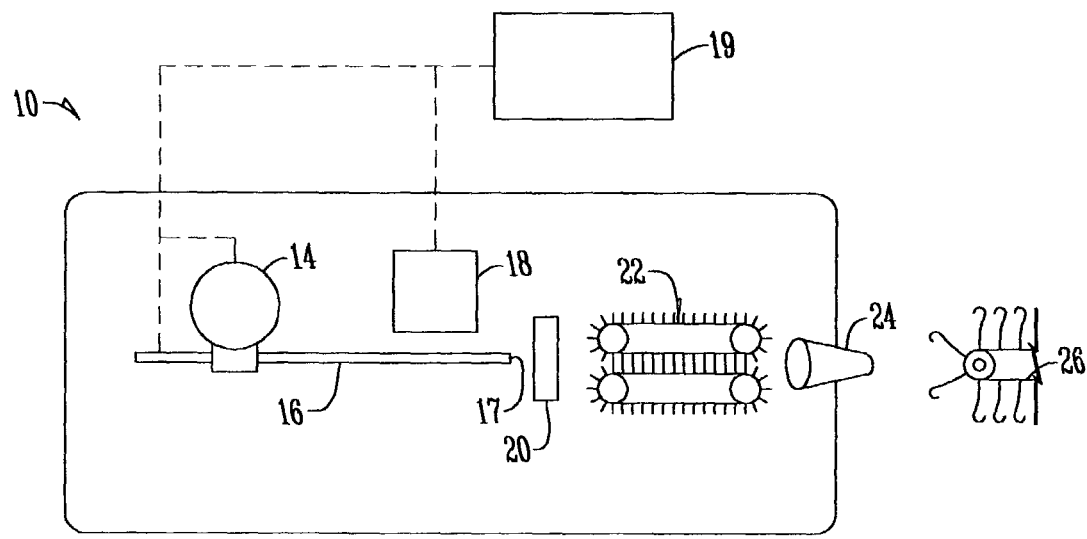
FIG. 1 is a schematic plan view showing a sausage encasing machine with the hopper of this invention.
Figure 2:
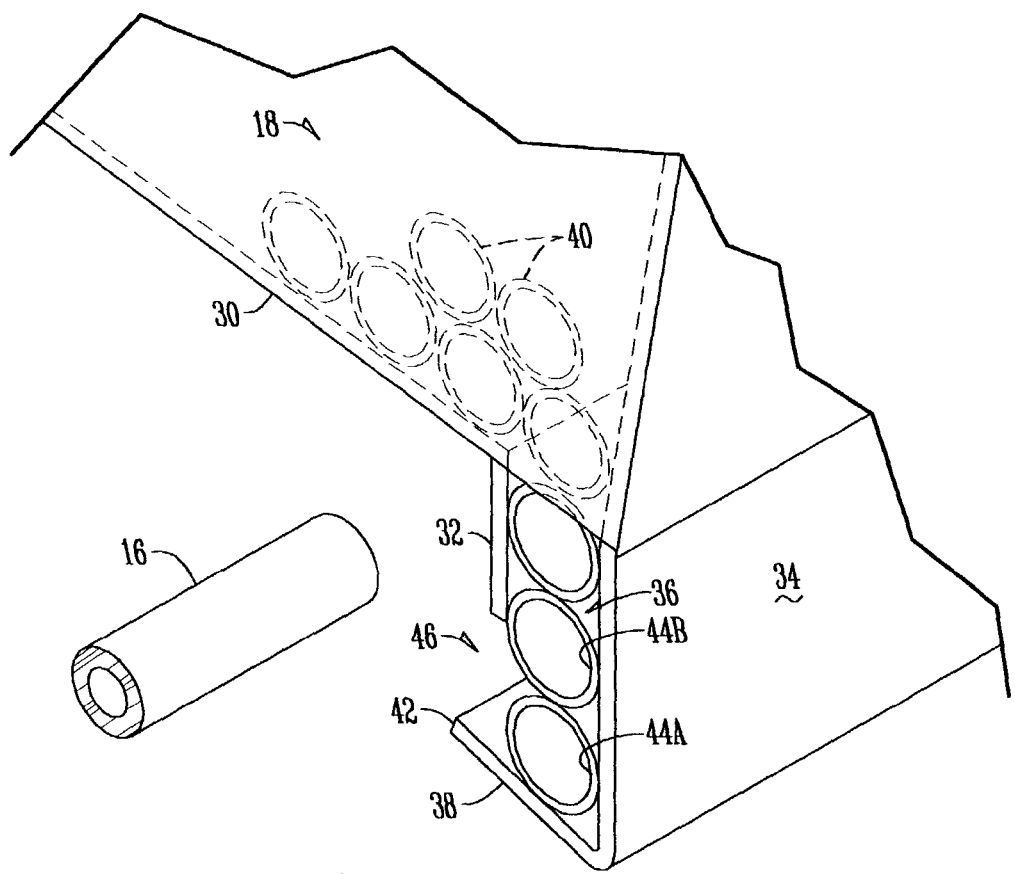
FIG. 2 is a partial perspective view of the lower part of the hopper and a closely positioned stuffing tube.

With reference to FIG. 1, a sausage encasing machine 10 has a frame 10. A meat emulsion pump 14 is mounted on the frame. A conventional stuffing tube 16 is mounted on the machine 10 in operative connection with the pump to transmit meat emulsion from the pump into the casing as will be described hereafter. The numeral 17 designates the discharge end of the tube.

A casing hopper 18 is mounted on the frame in any convenient manner. A controller 19 is mounted on or adjacent to the machine 10 and is operatively connected to various components on the machine including the hopper 18, the pump 14, and the longitudinally movable stuffing tube 16.

A conventional twister 20 is located downstream from the stuffing tube as is a conventional sausage strand linker 22. A conventional discharge horn 24 is located downstream of the linker to deposit linked sausage in a conventional manner to conveyor 26.

Figure 3:
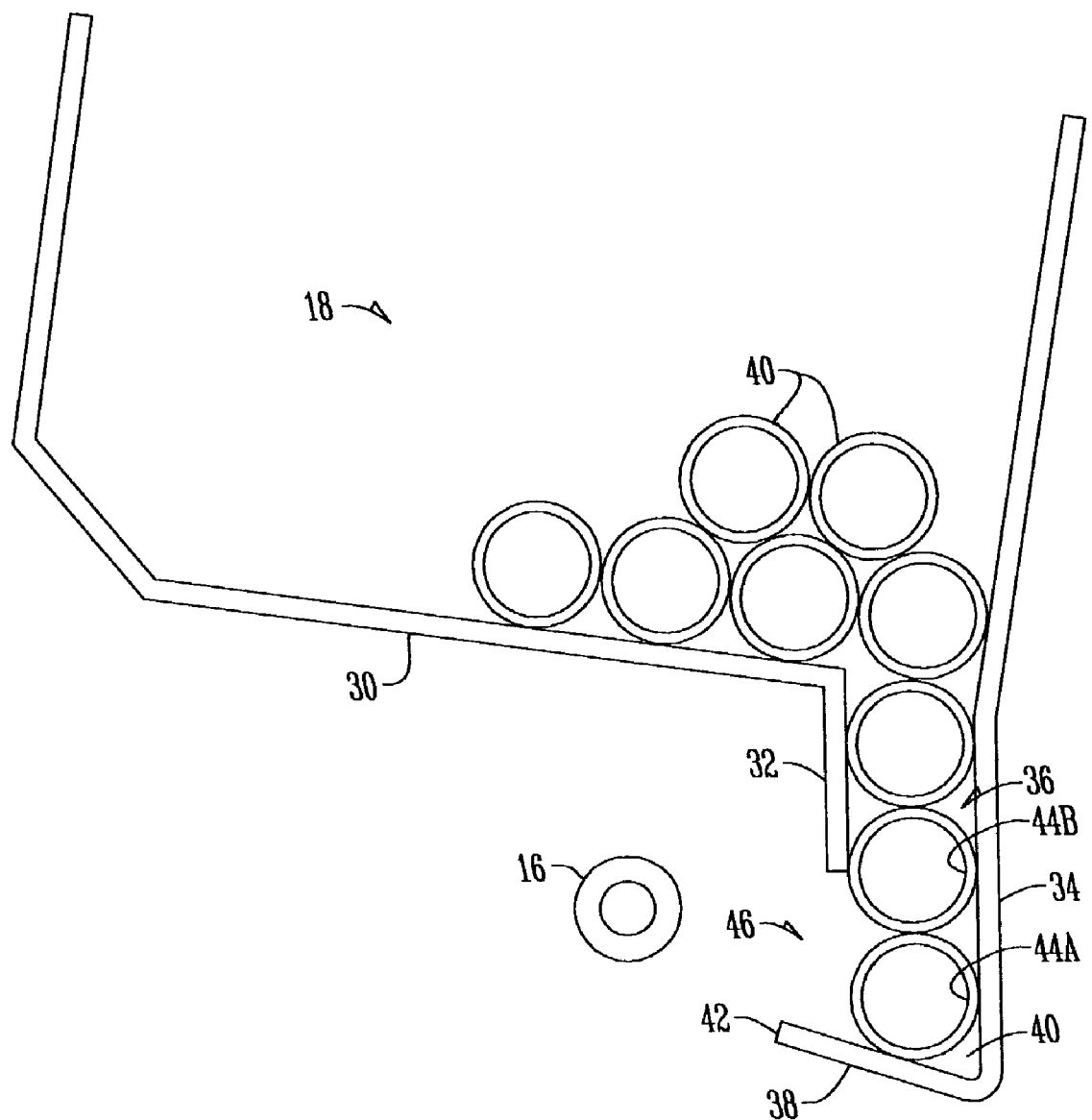
FIG. 3 is a cross section of a hopper with a plurality of casings therein.

With reference to FIG. 3, the hopper 18 has an inclined bottom 30 which terminates in a downwardly extending fence wall 32. The hopper also includes a chute wall 34 which is parallel to but in spaced relation to fence wall 32.

The fence wall 32 and chute wall 34 form a substantially vertical casing passageway 36 therebetween.

The chute wall 34 terminates in an inclined flange 38 which extends upwardly and inwardly from the lower end of the chute wall. The flange 38 forms a cradle portion 40 which is adapted to releasably hold the lowermost casing 44A. The flange 38 has an inner elongated edge 42.

Figure 4:
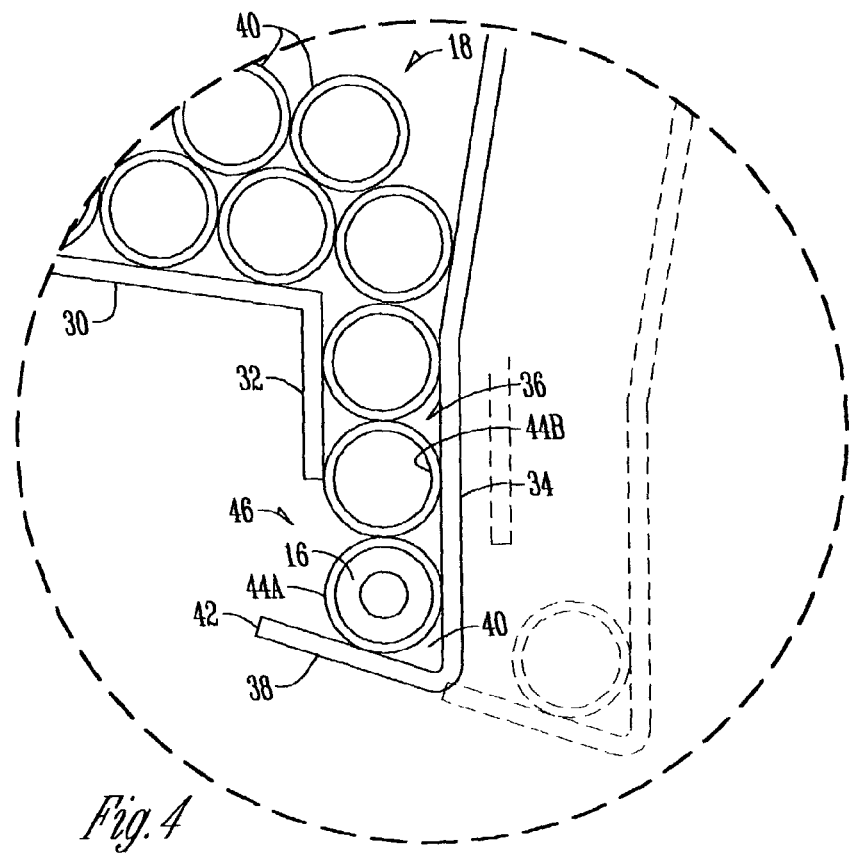
FIG. 4 is a cross sectional view similar to that of FIG. 3 but shows the hopper moved into a position of alignment with the stuffing tube.

A plurality of elongated shirred casings 44 including the previously mentioned bottom casing 44A and the next succeeding casing 44B are placed longitudinally within the hopper as shown in FIG. 4. The numeral 46 designates the space between the flange 38 (and cradle portion 40) and the lower end of the passageway 36 (and the lower end of fence wall 32).

The hopper 18 has at least two functions. The first is to position a casing for loading onto the stuffing tube 16. The second function is to retain the remaining casings in the hopper so that they can be loaded in subsequent machine cycles. These functions are accomplished primarily through the cradle to accurately position the casing for loading; the fence walls 32 and 34, and a linear motion linkage to shuttle the hopper between the loading position and the retracted position. FIG. 9 shows schematically a side elevation of the hopper and the stuffing tube, and their relative positions, as the casings are sequentially removed from the hopper for stuffing purposes. FIGS. 4 through 7 show cross sections through the hopper and the stuffing tube as the steps outlined in FIG. 9 are accomplished.

More specifically, a plurality of casings 44 are placed in the hopper so that a vertical stack of casings is deposited within the passageway 36 to locate a bottom casing 44A in the cradle with the next adjacent casing 44B remaining in the passageway directly above casing 44A. The space 46 is insufficient to allow more than one casing to be removed from the cradle portion 40 at a time.

With the cradle and the stuffing tube being normally positioned as shown in FIG. 3, the hopper is then moved laterally towards the retracted stuffing tube so that the discharge end 17 of the stuffing tube is in direct axial alignment with the casing 44A in the cradle 40. This is best shown in FIG. 4, and in step B of FIG. 9.

Figure 5:
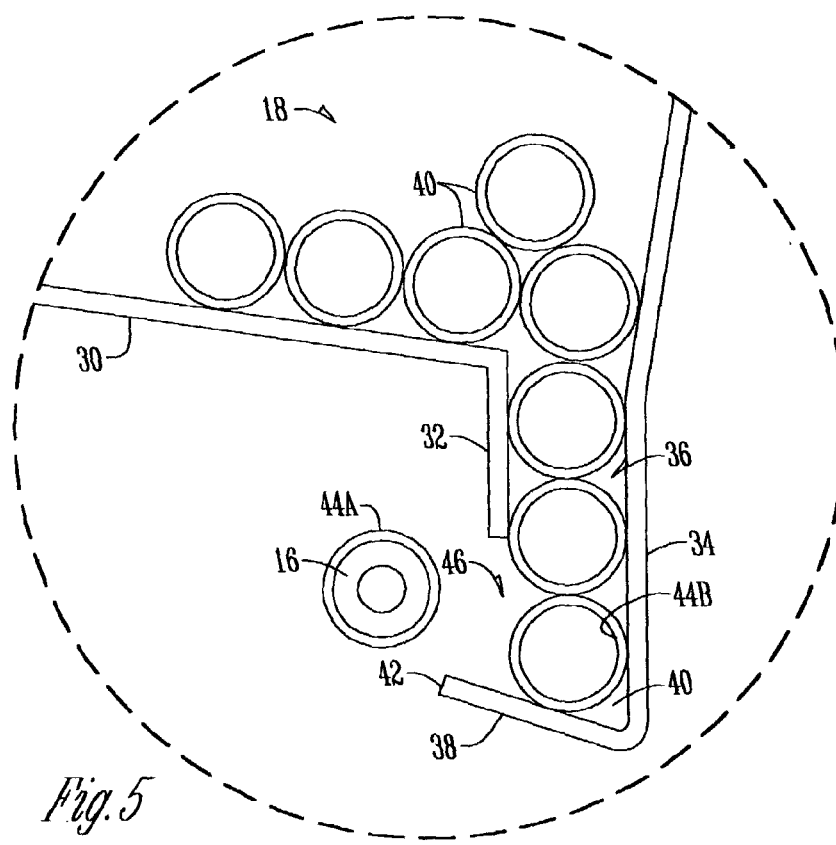
FIG. 5 shows the hopper in a withdrawn position from the stuffing tube after an initial casing has been deposited on the outer surface of the stuffing tube.

The stuffing tube 16 is then conventionally longitudinally moved forwardly to penetrate the casing 44A. The hopper is then pivoted, by any conventional means, back away from the stuffing tube 16 as best shown in FIG. 5 and step D of FIG. 9, leaving the casing 44A on stuffing tube 16.

Figure 6:
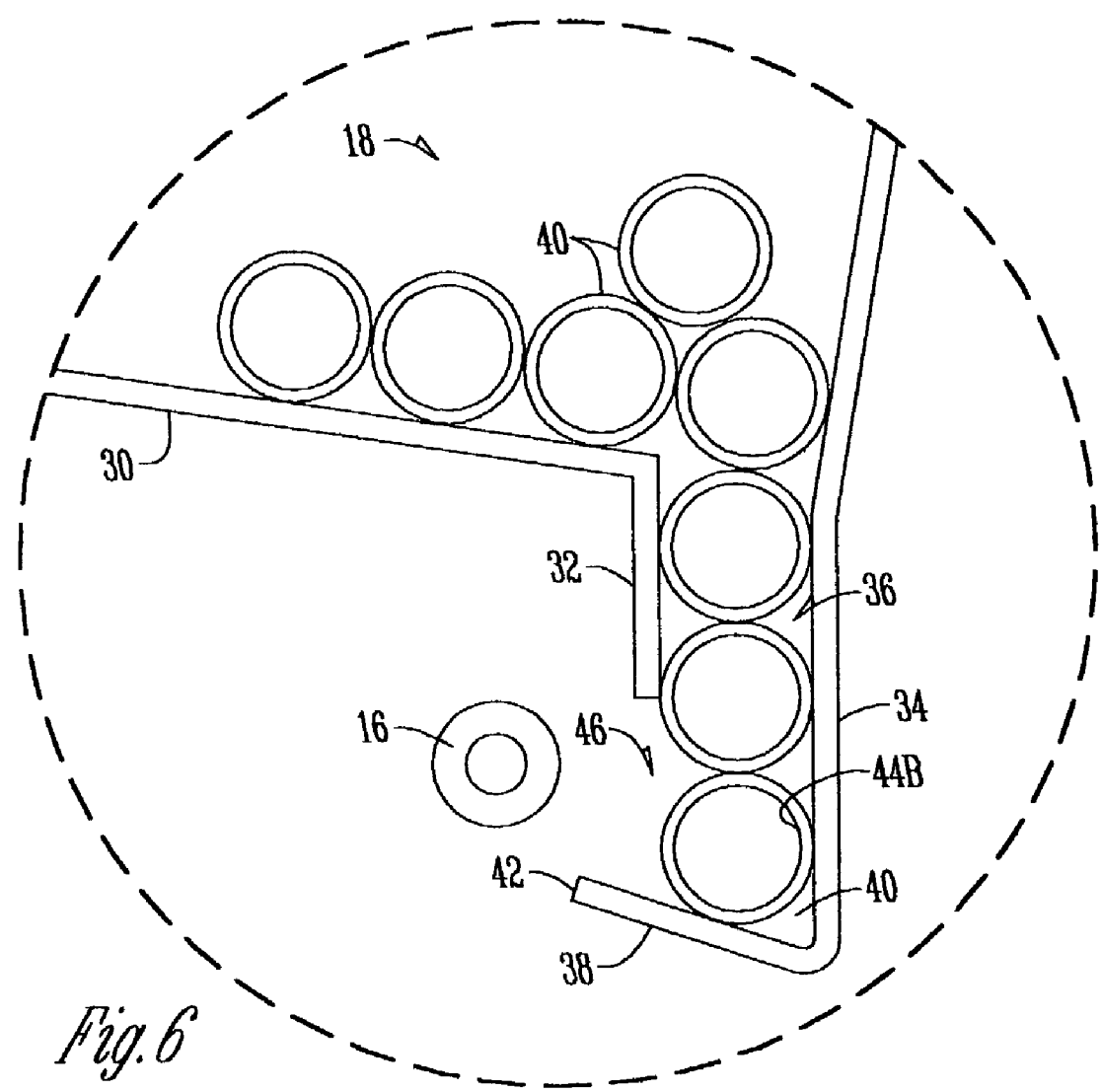
FIG. 6 is a view similar to FIG. 5 but shows the position of the hopper and the stuffing tube after the casing on the stuffing tube has been filled and after an additional casing has entered the cradle of the hopper.

The controller then causes pump 14 to move meat emulsion through the stuffing tube 16 to conventionally and sequentially fill the casing 44A with meat emulsion. This process progressively and sequentially removes the casing 44A from the end of stuffing tube 16. The completion of this phase of the process is best shown in FIG. 6 and in step E of FIG. 9.

The stuffing tube 16 is then longitudinally withdrawn to its initial position as shown in the steps A of FIG. 9 so that the cycle can be repeated.

Any conventional means can be employed to move the chute wall 34 laterally closer to fence wall 32 to narrow the width of passageway 36 to accommodate casings having a diameter smaller than the casings 44 shown in the drawings.

DESCRIPTION OF THE SECOND EMBODIMENT OF THE INVENTION

Figure 7:
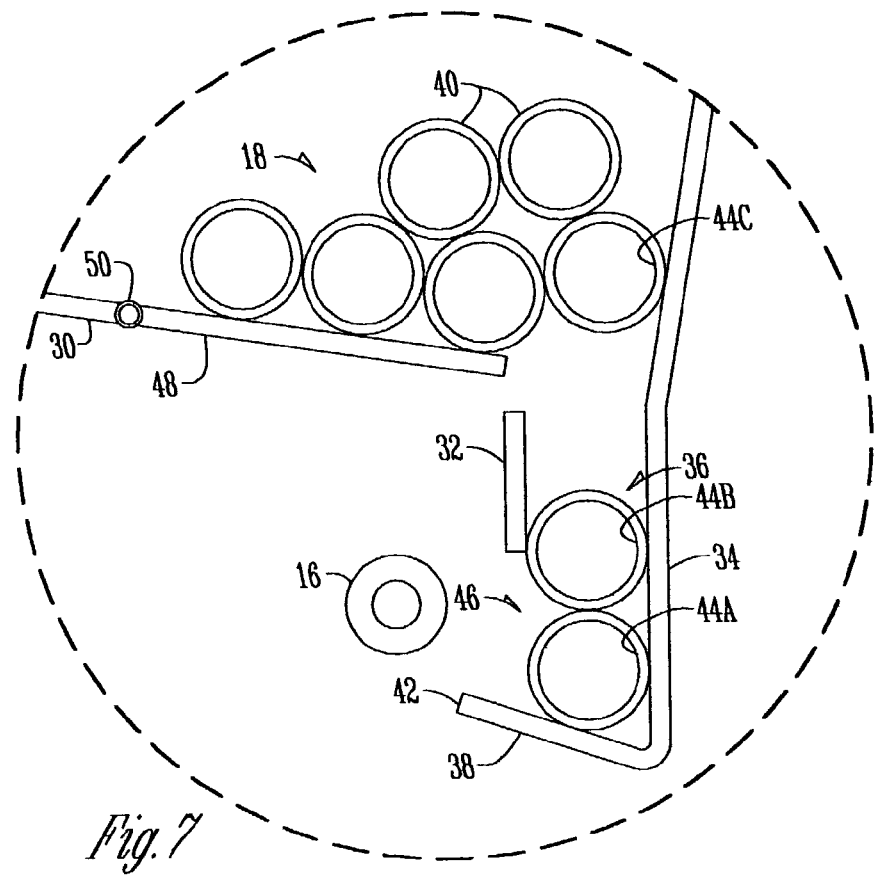
FIG. 7 is a view similar to FIG. 3 but shows an alternate form of the invention to provide a deflector for breaking up casings that are bridged within the hopper.
Figure 8:
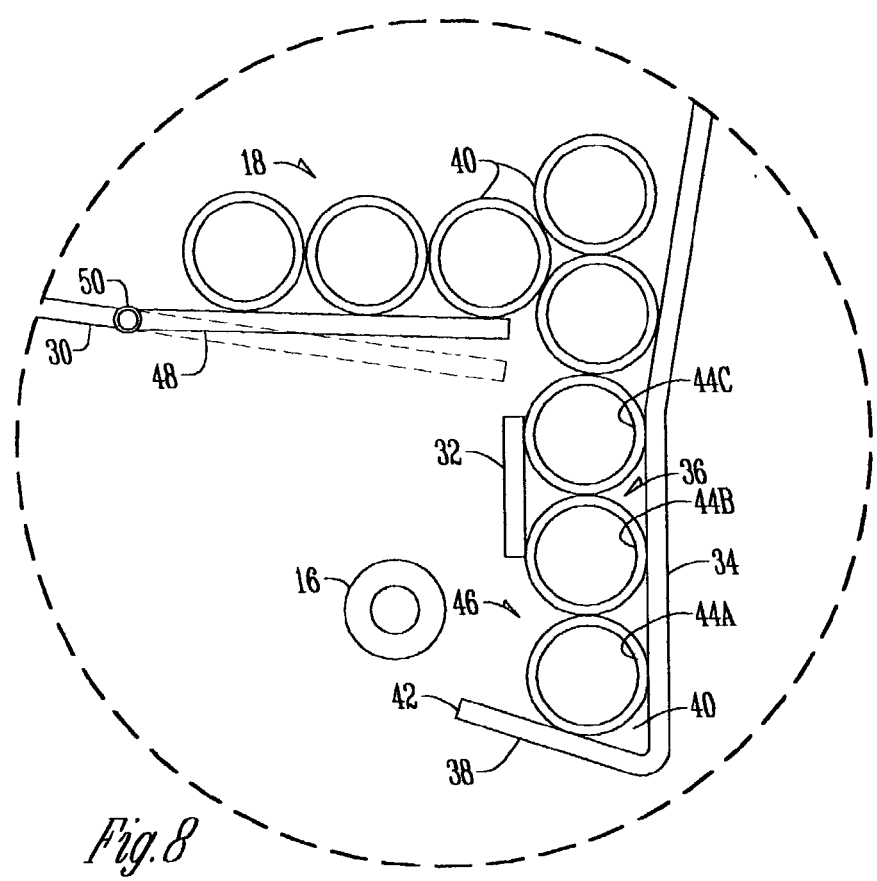
FIG. 8 is a view similar to that of FIG. 7 showing how the deflector moves to break up the bridging of the casings.

FIGS. 7 and 8 show an alternate form of the invention wherein the bottom 30 of hopper 18 terminates in a deflector plate 48 which is hinged to the hopper by hinge 50. Suitable means are attached to the member 48 to slightly raise that member with respect to the bottom 30 to slightly lift the casings resting thereon in the event that the casings become bridged as shown in FIG. 7. The slight movement of the member 48 as shown in FIG. 8 will dislodge the bridged casings shown in FIG. 7. Other than the foregoing descriptions of FIGS. 7 and 8, the structure of FIGS. 7 and 8 is used similarly to the structure of FIGS. 1–6.

The movement of the hopper 18 and the sequence of the operational steps outlined in FIG. 9 can be manually operated as well as being automatically operated by a suitable controller 19.

From the foregoing, it is seen that the casing hopper of this invention will achieve all of its stated objectives.

What is claimed is:

1. A casing hopper for sausage encasing machines, comprising,
    a hopper having a downwardly sloping bottom terminating in a downwardly extending fence wall,
    a chute wall substantially vertically disposed and being in lateral spaced relation to the fence wall to form a substantially vertical passageway,
    the chute wall terminating in an inclined flange that extends upwardly and inwardly below the passageway to form a cradle portion to receive only a single hollow casing,
    the passageway being only of sufficient width to receive a plurality of vertically stacked elongated hollow casings,
    the flange terminating in an inward elongated edge spaced from a lower end of the fence wall to permit only the single casing in the cradle to be moved relative to the hopper laterally outwardly from the flange beneath the fence wall.

2. The casing hopper of claim 1 wherein a portion of the bottom of the hopper adjacent a top of the fence wall be mounted for pivotal movement upwardly from the top of the fence wall to agitate elongated casings in the hopper that may be in bridging condition over a top of the passageway.

3. The machine of claim 1 wherein the chute wall is laterally movable with respect to the fence wall to widen or narrow the width of the passageway.

4. A sausage encasing machine, comprising,
    a frame,
    a sausage emulsion pump on the frame,
    an elongated longitudinally movable stuffing tube on the frame and being associated with the pump to deliver emulsion out of a discharge end into a tubular casing slidably mounted on an outer surface thereof,
    means on the frame for selectively longitudinally moving the stuffing tube,
    a casing chute on the frame adjacent the stuffing tube comprising a hopper having a downwardly sloping bottom terminating in a downwardly extending fence wall,
    a chute wall substantially vertically disposed and being in lateral spaced relation to the fence wall to form a substantially vertical passageway,
    the chute wall terminating in an inclined flange that extends upwardly and inwardly below the passageway to form a cradle portion to receive only a single hollow casing,
    the passageway being only of sufficient width to receive a plurality of longitudinally vertically stacked elongated hollow casings,
    the flange terminating in an inward elongated edge spaced from a lower end of the fence wall to permit only the single casing in the cradle to be moved laterally outwardly from the flange beneath the fence wall to be aligned with a stuffing tube on a sausage encasing machine, the stuffing tube being parallel to the cradle, power means on the frame for aligning the cradle and the casing in the cradle with the discharge end of the stuffing tube, so that the stuffing tube can be longitudinally moved to penetrate the casing in the cradle.

5. The machine of claim 4 wherein the power means can move the cradle away from the stuffing tube after the casing has been penetrated by the stuffing tube to allow the casings to be filled with emulsion, and to allow another casing in the passageway to fall into the cradle.

6. A method for loading elongated hollow casings on the outer surface of an elongated hollow sausage stuffing tube, comprising, providing a hopper having a downwardly sloping bottom terminating in a downwardly extending fence wall, providing a chute wall substantially vertically disposed and being in lateral spaced relation to the fence wall to form a substantially vertical passageway, the chute wall terminating in an inclined flange that extends upwardly and inwardly below the passageway to form a cradle portion to receive only a single hollow casing, the passageway being only of sufficient width to receive a plurality of longitudinally vertically stacked elongated hollow casings, the flange terminating in an inward elongated edge spaced from a lower end of the fence wall to permit only the single casing in the cradle to be moved laterally outwardly relative to the hopper from the flange beneath the fence wall when it is on the stuffing tube and the hopper moves away from the stuffing tube position, placing a plurality of casings in the hopper to create a vertical column in the passageway upwardly from the cradle, moving the cradle into a position of longitudinal alignment with the discharge end of a sausage stuffing tube, moving the stuffing tube longitudinally to penetrate the casing in the cradle, moving the cradle away from the stuffing tube to allow another casing in the passageway to fall into the cradle; and extruding meat emulsion from the tube into the casing that is on the stuffing tube.

* * * * *